United States Patent
Yamada et al.

(10) Patent No.: US 11,753,571 B2
(45) Date of Patent: Sep. 12, 2023

(54) THERMALLY CONDUCTIVE SHEET, ELECTRONIC DEVICE AND ONBOARD DEVICE, AND METHOD OF MANUFACTURING THERMALLY CONDUCTIVE SHEET

(71) Applicant: Yazaki Corporation, Tokyo (JP)

(72) Inventors: Yumi Yamada, Shizuoka (JP); Kenji Osada, Shizuoka (JP); Kenichi Kusayanagi, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 17/496,885

(22) Filed: Oct. 8, 2021

(65) Prior Publication Data

US 2022/0115160 A1    Apr. 14, 2022

(30) Foreign Application Priority Data

Oct. 14, 2020   (JP) ................. 2020-173292

(51) Int. Cl.
   *C09K 5/14*   (2006.01)
   *C08K 3/38*   (2006.01)
   *H01B 7/00*   (2006.01)

(52) U.S. Cl.
   CPC ............ *C09K 5/14* (2013.01); *H01B 7/0045* (2013.01); *C08K 2003/382* (2013.01)

(58) Field of Classification Search
   CPC ... C09K 5/14; H01B 1/20; H01B 1/22; H01B 1/24; H01B 7/0045; C08K 3/38; C08K 2003/382; C08K 2201/001; C08J 5/18
   See application file for complete search history.

(56) References Cited

U.S. PATENT DOCUMENTS

| | | | | |
|---|---|---|---|---|
| 9,656,868 | B2* | 5/2017 | Nishi | C09K 5/14 |
| 10,113,097 | B2* | 10/2018 | Zaggl | C09K 5/14 |
| 2003/0194544 | A1* | 10/2003 | Tobita | C08K 7/06 |
| | | | | 524/496 |

FOREIGN PATENT DOCUMENTS

| | | | | |
|---|---|---|---|---|
| EP | 2966036 A1 | * | 1/2016 | ............... C09K 5/14 |
| JP | 64-66021 A | | 3/1989 | |
| JP | 6466021 A | * | 3/1989 | |
| JP | 2002-80617 A | | 3/2002 | |
| JP | 2002080617 A | * | 3/2002 | |
| JP | 2003-301048 A | | 10/2003 | |
| JP | 2013-225541 A | | 10/2013 | |
| JP | 2015-071287 A | | 4/2015 | |
| JP | 2017-183680 A | | 10/2017 | |
| JP | 2017183680 A | * | 10/2017 | |
| JP | 2020192694 A | * | 12/2020 | |
| WO | WO-2020261641 A1 | * | 12/2020 | |

* cited by examiner

*Primary Examiner* — Matthew R Diaz
(74) *Attorney, Agent, or Firm* — Sughrue Mion, PLLC

(57) ABSTRACT

A thermally conductive sheet includes a resin composition including a silicone rubber, and thermally conductive fillers that are anisotropic, the thermally conductive fillers being dispersed in the silicone rubber. A content of the thermally conductive fillers in the resin composition is 52% by volume or more and 75% by volume or less. Major axes of the thermally conductive fillers are oriented in a thickness direction of the thermally conductive sheet, and a ratio of a peak intensity of a (002) plane to a peak intensity of a (100) plane in a spectrum measured from the thickness direction by an X-ray diffraction method is 0.31 or less.

5 Claims, 1 Drawing Sheet

THERMALLY CONDUCTIVE SHEET, ELECTRONIC DEVICE AND ONBOARD DEVICE, AND METHOD OF MANUFACTURING THERMALLY CONDUCTIVE SHEET

CROSS-REFERENCE TO RELATED APPLICATIONS

The present application is based on, and claims priority from Japanese Patent Application No. 2020-173292, filed on Oct. 14, 2020, the entire contents of which are incorporated herein by reference.

TECHNICAL FIELD

The present disclosure relates to a thermally conductive sheet, an electronic device and an onboard device each using the same, and a method of manufacturing the thermally conductive sheet.

BACKGROUND

Automobiles are equipped with various electronic devices, and these electronic devices may use heating elements such as power semiconductor devices. Since the heat emitted by the heating elements may cause the electronic devices to malfunction, heat is to be efficiently removed from the heating elements to prevent the heating elements from becoming too hot. Therefore, a thermally conductive sheet is disposed between the heating element and a heat-dissipating body such as a heat sink, and the heat of the heating element is transmitted to the heat-dissipating body through the thermally conductive sheet to cool the heating element.

Thermally conductive sheets are known to have thermally conductive fillers dispersed in resin. As a method of manufacturing such a thermally conductive sheet, JP2015-71287A discloses a method of fusing a resin sheet precursor including fillers oriented in the plane direction while folding it in a direction substantially perpendicular to the extrusion direction to orient the fillers in the thickness direction of the resin sheet.

SUMMARY

When the thermally conductive fillers are oriented in the thickness direction of the resin sheet, a thermally conductive path is formed in the thickness direction, and heat can be efficiently taken from the heating element. However, in the method of JP2015-71287A, the resin sheet precursor is folded by changing the flow of the resin sheet precursor by utilizing the difference in the size of cross-sectional areas of the flow path. Therefore, the resin sheet may be folded while meandering, and it is difficult to accurately control the orientation of fillers. When the resin sheet is folded in a meandering manner, sufficient thermal conductivity may not be obtained.

The present disclosure is made in view of the above issue. An object of the present disclosure is to provide a thermally conductive sheet having high thermal conductivity in a thickness direction thereof, an electronic device and an onboard device each using the thermally conductive sheet, and a method of manufacturing the thermally conductive sheet.

A thermally conductive sheet according to one aspect of the present disclosure includes a resin composition including: a silicone rubber; and thermally conductive fillers that are anisotropic, the thermally conductive fillers being dispersed in the silicone rubber. A content of the thermally conductive fillers in the resin composition is 52% by volume or more and 75% by volume or less. Major axes of the thermally conductive fillers are oriented in a thickness direction of the thermally conductive sheet, and a ratio of a peak intensity of a (002) plane to a peak intensity of a (100) plane in a spectrum measured from the thickness direction by an X-ray diffraction method is 0.31 or less.

A method of manufacturing a thermally conductive sheet according to another aspect of the present disclosure includes: forming a layered body by folding a resin sheet that comprises a resin composition comprising a silicone and thermally conductive fillers that are anisotropic, the thermally conductive fillers being dispersed in the silicone, and has major axes of the thermally conductive fillers oriented in a plane direction by pleating by a first blade disposed on one surface side of the resin sheet and a second blade disposed on another surface side opposite to the one surface side of the resin sheet. The method of manufacturing a thermally conductive sheet includes: cross-linking the silicone in the layered body to form a cross-linked layered body. A content of the thermally conductive fillers in the resin composition is 52% by volume or more and 75% by volume or less. A ratio of a peak intensity of a (002) plane to a peak intensity of a (100) plane in a spectra measured from a thickness direction of the thermally conductive sheet by an X-ray diffraction method is 0.31 or less.

The present disclosure provides a thermally conductive sheet having high thermal conductivity in a thickness direction thereof, an electronic device and an onboard device each using the thermally conductive sheet, and a method of manufacturing the thermally conductive sheet.

DETAILED DESCRIPTION

Figure 1:
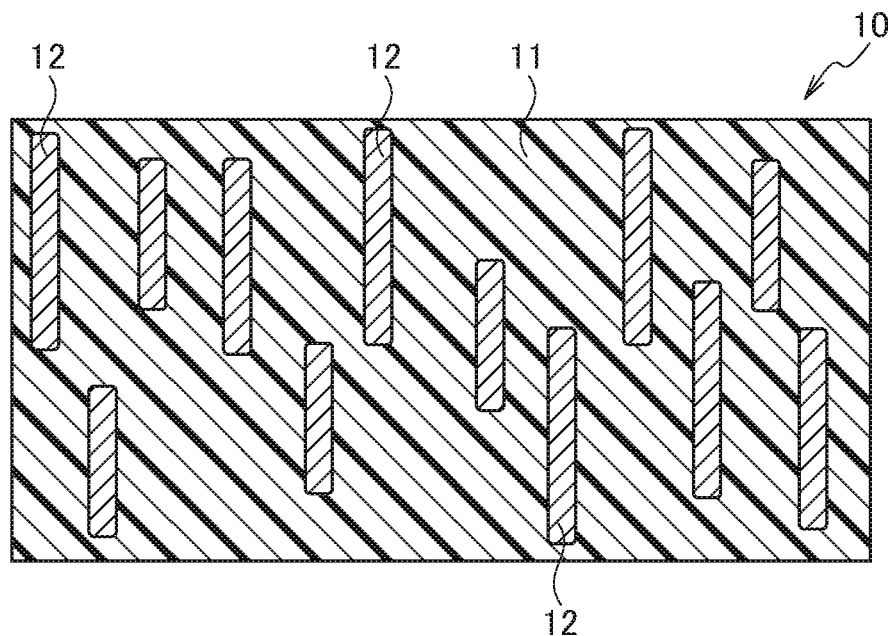
FIG. 1 is a sectional view of an example of a thermally conductive sheet according to a present embodiment.

The following describes a thermally conductive sheet, an electronic device and an onboard device, and a method of manufacturing the thermally conductive sheet according to the present embodiment in detail with reference to the drawings. Dimensional ratios in the drawings are exaggerated for explanation and may differ from the actual ratios.

[Thermally Conductive Sheet]

A thermally conductive sheet 10 according to the present embodiment includes a resin composition. As illustrated in FIG. 1, the resin composition includes a silicone rubber 11, and thermally conductive fillers 12 that are anisotropic, the thermally conductive fillers 12 being dispersed in the silicone rubber 11.

The silicone rubber 11 includes a cross-linked body obtained by cross-linking a silicone. The silicone rubber 11 has a high effect of absorbing physical vibrations and thus is usable in a place with many vibrations, such as a vehicle. The silicone is a polyorganosiloxane having a main chain composed of siloxane bonds. The silicone may include a homopolymer or copolymer of an organosiloxane, such as a dimethylsiloxane. The silicone may include at least one selected from the group consisting of a vinyl silicone, a phenyl silicone, and a fluorinated silicone.

The silicone rubber 11 may be a peroxide cross-linking type, an addition reaction cross-linking type, or a combination thereof. In the peroxide cross-linking type, for example, an organic peroxide is added to a silicone to generate free radicals, and the silicone is cross-linked to produce the silicone rubber 11. In the addition reaction cross-linking type, for example, a silicone having a vinyl group is cross-linked by hydrosilylation in the presence of a platinum catalyst to produce the silicone rubber 11.

The thermally conductive fillers 12 are fillers having thermal conductivity and efficiently take heat from a heating element. Preferably, the thermal conductivity of the thermally conductive fillers 12 is larger than that of the silicone rubber 11. Specifically, the thermal conductivity of the thermally conductive fillers 12 is preferably 5 W/m·K or more, more preferably 10 W/m·K or more. The thermal conductivity of the thermally conductive fillers 12 is preferably larger and has no upper limit, but may be, for example, 500 W/m·K or less, or 300 W/m·K or less. The thermal conductivity is obtained by calculating the product of a thermal diffusivity, a specific heat capacity, and a density. The thermal diffusivity is measured by a laser flash method in accordance with JIS R1611. The specific heat capacity is measured by a differential scanning calorimetry (DSC) method in accordance with JIS K7123-1987. The density is measured by an underwater displacement method in accordance with JIS K7112:1999.

The thermally conductive fillers 12 may contain at least one of an inorganic substance or a metal. The inorganic substance may include, for example, at least one substance selected from the group consisting of a boron nitride, a carbon, an alumina, and an aluminum nitride. Preferably, the thermally conductive fillers 12 include a boron nitride because of its excellent thermal conductivity and electrical insulation.

The thermally conductive fillers 12 have anisotropy and each have, for example, a shape other than spherical or other than substantially spherical. Specifically, the thermally conductive fillers 12 each have an aspect ratio of a major axis and a minor axis of a cross section passing through a center thereof, for example, 2 or more. The aspect ratio may be 5 or more, or 10 or more. The aspect ratio may be 100 or less, or 50 or less. The major axis is the longest part passing through the center of the thermally conductive filler 12, and the minor axis is the shortest part passing through the center of the thermally conductive filler 12. The thermally conductive fillers 12 may each have, for example, at least one shape selected from the group consisting of a scale, a plate, a membrane, a cylinder, an ellipse, a flat, a spiral, a fiber, and a needle.

The thermally conductive fillers 12 may be scaly, plate-like, film-like, cylindrical, elliptical, or flat fillers including a boron nitride, a graphite, a graphene, or the like. The thermally conductive fillers 12 may be fibrous or needle-like fillers, such as a carbon, an alumina, an aluminum nitride, a metal, a boron nitride nanotube, or a carbon nanotube.

Preferably, the average particle diameter of the thermally conductive fillers 12 is 20 µm or more and 100 µm or less. When the average particle diameter is 20 µm or more, thermally conductive fillers 12 dispersed in the silicone easily come into contact with each other in an oriented state to form a thermally conductive path, thereby improving the heat dissipation property of the thermally conductive sheet 10. When the average particle diameter is 100 µm or less, the thermally conductive sheet 10 having a stable shape is obtained. In the present specification, the average particle diameter is the average of the major axes of at least 10 or more inorganic particles measured using a microscope, such as a transmission electron microscope (TEM) or a scanning electron microscope (SEM).

The content of the thermally conductive fillers 12 in the resin composition is 52% by volume or more and 75% by volume or less. When the content of the thermally conductive fillers 12 is 52% by volume or more, the thermal conductivity of the thermally conductive sheet 10 is enhanced. When the content of the thermally conductive fillers 12 is 75% by volume or less, the thermally conductive sheet 10 having a stable shape is obtained. The content of the thermally conductive fillers 12 is preferably 70% by volume or less, more preferably 65% by volume or less, still more preferably 60% by volume or less, particularly preferably 58% by volume or less.

The resin composition may include spherical or substantially spherical thermally conductive fillers that are isotropic, in addition to the silicone, and the thermally conductive fillers 12 that are anisotropic. The isotropic thermally conductive fillers may include a material similar to the anisotropic thermally conductive fillers 12, or a material different from the anisotropic thermally conductive fillers 12. In addition to the silicone and the thermally conductive fillers, the resin composition may include a known additive, such as a reinforcing agent, a filler, a softening agent, a plasticizer, an anti-aging agent, an adhesive agent, an antistatic agent, and a kneaded adhesive.

Major axes of the thermally conductive fillers 12 are each oriented in a thickness direction, and a ratio of the peak intensity of a (002) plane to the peak intensity of a (100) plane is 0.31 or less in a spectrum measured from the thickness direction of the thermally conductive sheet by an X-ray diffraction method. The (100) plane and the (002) plane are crystal planes orthogonal to each other. When the above-described ratio is set to 0.31 or less, a ratio at which the (100) plane of the thermally conductive filler 12 is oriented in the thickness direction of the sheet is increased, thereby improving the thermal conductivity of the thermally conductive sheet 10 in the thickness direction. The peak intensity of the crystal planes is measured on the surface of the thermally conductive sheet 10 in the thickness direction by the X-ray diffraction method. In the present specification, the peak intensity represents an integrated area of a peak.

Preferably, the thermal conductivity of the thermally conductive sheet 10 in the thickness direction is 8 W/m·K or more. Such a thermally conductive sheet 10 has high thermal conductivity from one surface to the other surface and thus efficiently removes heat from the heating element. The thermal conductivity is preferably larger and has no upper limit but is, for example, 100 W/m·K. The thermal conductivity is measured by the method described above.

The thickness of the thermally conductive sheet 10 may be suitably varied according to the application but may be, for example, 0.1 mm to 10 mm. When the thickness of the thermally conductive sheet 10 is in such a range, heat dissipation is high, and handling is easy.

As described above, the thermally conductive sheet 10 according to the present embodiment includes the resin composition including the silicone rubber 11 and the anisotropic thermally conductive fillers 12 dispersed in the silicone rubber 11. The content of the thermally conductive fillers 12 in the resin composition is 52% by volume or more and 75% by volume or less. The major axes of the thermally conductive fillers 12 are oriented in the thickness direction, and the ratio of the peak intensity of the (002) plane to the peak intensity of the (100) plane is 0.31 or less in a spectrum measured from the thickness direction of the thermally conductive sheet 10 by the X-ray diffraction method. Thus, the thermally conductive sheet 10 has high thermal conductivity in the thickness direction. Therefore, when a heating element is covered with the thermally conductive sheet 10, heat is efficiently removed from the heating element.

[Electronic Device]

An electronic device according to the present embodiment includes the thermally conductive sheet 10. As described above, the thermally conductive sheet 10 has high thermal conductivity in the thickness direction. Therefore, using the thermally conductive sheet 10 for the electronic device prevents malfunction due to heat generation by the electronic device. The electronic device may include a heating element and the thermally conductive sheet 10 covering the heating element. Covering the heating element with the thermally conductive sheet 10 takes heat from the heating element disposed on one surface of the thermally conductive sheet 10 and dissipates heat from a heat dissipation surface that is the other surface of the thermally conductive sheet 10. A heat-dissipating body, such as a heat sink, may be provided on the heat dissipation surface of the thermally conductive sheet 10. The heating element and the thermally conductive sheet 10 may be in direct contact with each other or may be in indirect contact via a layer, such as an adhesive. The thermally conductive sheet 10 and the heat-dissipating body may be in direct contact with each other or may be in indirect contact via a layer, such as an adhesive.

The heating element includes, for example, a power semiconductor element, and an IC (Integrated Circuit). Examples of the power semiconductor element include a diode, a thyristor, a gate turn-off thyristor, a MOSFET (Metal-Oxide-Semiconductor Field-Effect Transistor), and an IGBT (Insulated Gate Bipolar Transistor).

The silicone rubber 11 is used for the thermally conductive sheet 10 of the electronic device. Since the silicone rubber 11 easily absorbs vibration, the electronic device may be mounted on a vehicle. The electronic device is however not limited to an onboard device and may be a household electronic device.

[Onboard Device]

An onboard device according to the present embodiment includes the above-described electronic device, and a wire harness electrically connected to the electronic device. As described above, the electronic device effectively removes heat by the thermally conductive sheet 10. Therefore, the onboard device provided with the above-described electronic device reduces malfunction due to heat.

The wire harness may include a plurality of insulated wires, and a connector provided at the end of the plurality of insulated wires. The insulated wires may each include a metal conductor, and an insulating layer covering the metal conductor. The connector is provided to be electrically connectable to a mating connector, and by being connected to the mating connector, the connector is electrically connectable to an electronic device provided with the mating connector.

[Method of Manufacturing Thermally Conductive Sheet]

Figure 2:
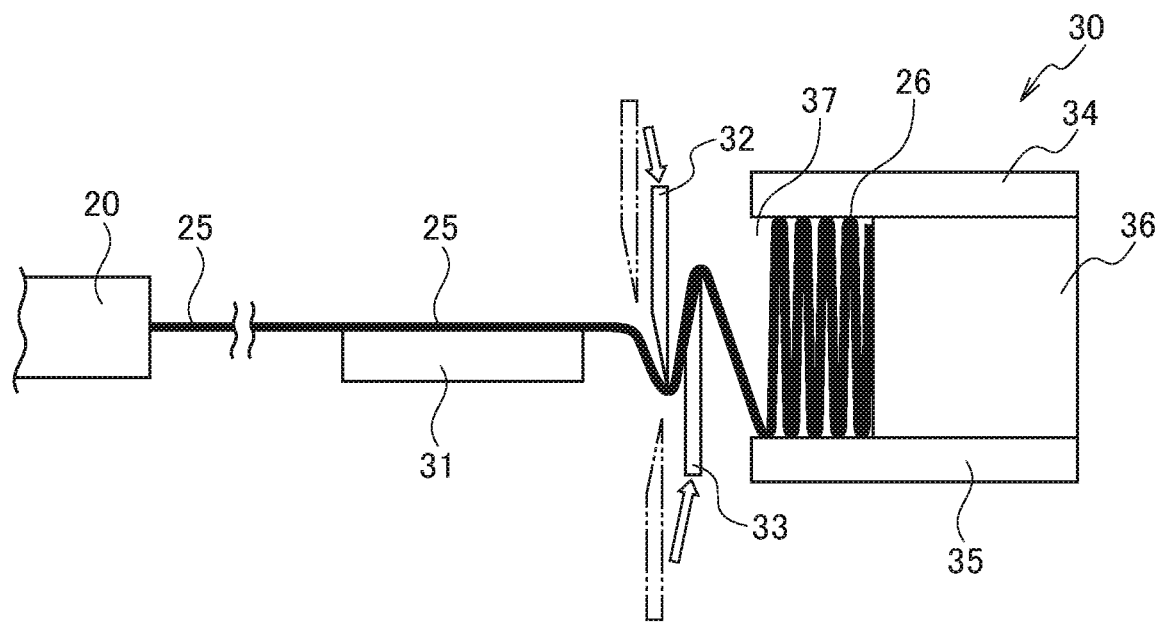
FIG. 2 is a schematic view of an example of a method of manufacturing the thermally conductive sheet according to the present embodiment.

A method of manufacturing the thermally conductive sheet 10 includes a layered body forming step, a cross-linking step, and a slicing step. For example, as illustrated in FIG. 2, the thermally conductive sheet 10 is made by an extruder 20 and a layered body forming machine 30. The method of manufacturing the thermally conductive sheet 10 according to the present embodiment is described below with reference to FIG. 2.

(Layered Body Forming Process)

In the layered body forming step, the resin sheet 25 is formed that includes the resin composition including the silicone and the anisotropic thermally conductive fillers 12 dispersed in the silicone and has major axes of the thermally conductive fillers 12 oriented in a plane direction. The resin sheet 25 may be formed by the extruder 20, for example. Raw materials such as silicone and thermally conductive fillers 12 may be pre-mixed in a mixer and then indirectly fed into the extruder 20 or may be fed directly into the extruder 20. The raw materials may be fed to the mixer or the extruder 20 in one step at a time or may be fed to the mixer or the extruder 20 separately in multiple steps.

The mixer is not limited as long as the raw materials can be mixed. For example, a known mixer, such as a Banbury mixer, a kneader, or a roll mill, is usable. For the extruder 20, a known extruder, such as a single screw extruder, or a twin screw extruder, is usable. At an outlet of the extruder 20, for example, a T-die is provided, and by extruding the resin composition from the T-die into a sheet shape and taking up the sheet-like extruded product, major axes of the thermally conductive fillers 12 are oriented in the extrusion direction (machine direction). That is, major axes of the thermally conductive fillers 12 can be oriented in the plane direction of the resin sheet 25. The sheet-like extruded product may be cooled with a cooling roll or the like as necessary at the time of taking up.

In the present embodiment, an example of manufacturing the resin sheet 25 using the extruder 20 is described, but the present embodiment is not limited to this embodiment. For example, the resin sheet 25 produced by mixing raw materials in a roll mill or the like may be used as the resin sheet 25 having major axes of the thermally conductive fillers 12 oriented in the plane direction.

The silicone can be obtained, for example, by dehydrating and condensing a silanol formed from an organohalosilane, such as a dimethyldichlorosilane. The silicone can also be obtained, for example, by ring-opening polymerization of a cyclic diorganosiloxane.

The thermally conductive fillers 12 may be ones as described above. The content of the thermally conductive fillers 12 in the resin composition is 52% by volume or more and 75% by volume or less. The thermally conductive fillers 12 may be surface-treated with a surface treatment agent, such as a silane coupling agent or a surfactant, to improve the reactivity to the silicone. The thermally conductive fillers 12 may be surface-treated prior to being added to the silicone or may be surface-treated by an integral blending process while being mixed with the silicone. However, to further improve the reactivity of the thermally conductive fillers 12 to the silicone, preferably, the thermally conductive fillers 12 are surface-treated before being added to the silicone.

The raw materials may include a cross-linker, a plasticizer, such as a silicone oil, or an additive described above, such as a reinforcing agent. The cross-linker may include, for example, an organic peroxide. Adding an organic peroxide generates free radicals in the silicone in the cross-linking step described later. Examples of the organic peroxide used include a 2,5-dimethyl-2,5-bis(tert-butyl peroxy)hexane, a dicumyl peroxide, a di-tert-butyl peroxide, a 2,5-dimethyl-2,5-bis(tert-butyl peroxy)hexine-3, a 1,3-bis(tert-butyl peroxy isopropyl)benzene, a 1,1-bis(tert-butyl peroxy)-3,3,5-trimethylcyclohexane, an n-butyl-4,4-bis(tert-butyl peroxy)valerate, a benzoyl peroxide, a 2,4-dichlorobenzoyl peroxide, a tert-butyl peroxy benzoate, a tert-butyl peroxy isopropyl carbonate, a diacetyl peroxide, a lauroyl peroxide, and a tert-butyl cumyl peroxide. The organic peroxide may be used alone or in combination of two or more. Preferably, the amount of the organic peroxide added is 0.05 to 3 parts by mass per 100 parts by mass of the silicone.

Preferably, forming temperature in the extruder is lower than temperature at which the silicone is cross-linked by the cross-linker. The forming temperature is suitably changeable depending on the composition of the resin composition or the like, but it is for example, from 20° C. to 50° C.

While the thickness of the resin sheet 25 is not limited as long as the above-described peak intensity ratio of the thermally conductive sheet 10 is equal to or less than a predetermined value, by adjusting the thickness of the sheet during extrusion, major axes of the thermally conductive fillers 12 are oriented in the extrusion direction of the resin sheet 25. Specifically, by setting the sheet thickness in a range of, for example, 0.3 to 2.0 mm, the major axes of the thermally conductive fillers 12 are oriented in the extrusion direction of the sheet.

The thickness of the resin sheet 25 is not limited but is preferably 0.1 mm or more, more preferably 0.3 mm or more from the viewpoint of production speed. The thickness of the resin sheet 25 is preferably 5 mm or less, more preferably 2 mm or less from the viewpoint of ease of production.

The resin sheet 25 may be indirectly supplied to the layered body forming machine 30 described later after being wound in a roll shape by a winding roll or may be directly supplied to the layered body forming machine 30 without being wound by a winding roll or the like.

(Layered Body Forming Process)

In the layered body forming step, the resin sheet 25 is folded by pleating to form a layered body 26. The pleating can be formed by the layered body forming machine 30, such as an accordion pleating machine, as illustrated in FIG. 2. The layered body forming machine 30 includes, for example, a mounting table 31, a first blade 32, a second blade 33, a first plate 34, a second plate 35, and a slide portion 36.

The resin sheet 25 supplied from the winding roll or the extruder 20 to the layered body forming machine 30 is placed on the mounting table 31. The mounting table 31 supports the resin sheet 25 when the resin sheet 25 is conveyed. The mounting table 31 is used for temporarily supporting the resin sheet 25, and something like a conveying roll for conveying the resin sheet 25 may be used instead of the mounting table 31. The resin sheet 25 passing through the mounting table 31 passes between the first blade 32 and the second blade 33 to be conveyed toward a space 37 surrounded by the first plate 34, the second plate 35, and the slide portion 36.

The first blade 32 is disposed on one surface side of the resin sheet 25. Specifically, the first blade 32 is disposed above the resin sheet 25. The first blade 32 is a substantially rectangular blade extending in a width direction of the resin sheet 25, which is perpendicular to the extrusion direction and the thickness direction of the resin sheet 25. The first blade 32 is provided to move in the thickness direction and the extrusion direction of the resin sheet 25. Thus, when the first blade 32 moves downward, the resin sheet 25 passing under the first blade 32 is pressed down while being bent so that a bending part (bending line) is formed along the width direction of the resin sheet 25 at a part where the first blade 32 contacts. The first blade 32 moves forward in the extrusion direction in contact with the resin sheet 25, thereby moving the resin sheet 25 forward in the extrusion direction.

The second blade 33 is disposed on a surface side opposite to one surface of the resin sheet 25. Specifically, the second blade 33 is disposed below the resin sheet 25. The second blade 33 is a substantially rectangular blade extending in the width direction of the resin sheet 25. The second blade 33 is provided to move in the thickness direction and the extrusion direction of the resin sheet 25. Thus, when the second blade 33 moves upward, the resin sheet 25 passing above the second blade 33 is pushed up while being bent so that a bending part is formed along the width direction of the resin sheet 25 at a part where the second blade 33 contacts. The second blade 33 moves forward in the extrusion direction in contact with the resin sheet 25, thereby moving the resin sheet 25 forward in the extrusion direction.

The first blade 32 and the second blade 33 are disposed at a predetermined interval in the extrusion direction. The first blade 32 pushes down the resin sheet 25 while bending it, and the second blade 33 pushes up the resin sheet 25 while bending it. The first blade 32 and the second blade 33 move forward in the extrusion direction. Thus, the resin sheet 25 is received in the space 37 while being bent in a Z-shape. When the resin sheet 25 is bent in a Z-shape by the first blade 32 and the second blade 33, the resin sheet 25 may be extended between the bent parts. This makes it easier to orient major axes of the thermally conductive fillers 12 in the extrusion direction of the resin sheet 25.

The first blade 32 and the second blade 33 return to their original positions when the Z-shaped resin sheet 25 is received in the space 37. Then, the first blade 32 moves downward in the thickness direction and forward in the extrusion direction, and the second blade 33 moves upward in the thickness direction and forward in the extrusion direction, thereby bending the resin sheet 25 in a Z-shape as before. By repeating this, the first blade 32 and the second blade 33 repeatedly bend the resin sheet 25 in Z-shapes at a predetermined interval in the extrusion direction. In the present embodiment, the first blade 32 is disposed forward in the extrusion direction with respect to the second blade 33, but the first blade 32 may be disposed backward in the extrusion direction with respect to the second blade 33.

The space 37 has a slide portion 36 provided forward in the extrusion direction of the resin sheet 25. The second plate 35 is disposed in parallel with the first plate 34 through the space 37, and the slide portion 36 is disposed between the first plate 34 and the second plate 35. The slide portion 36 is provided to be slidable with respect to the first plate 34 and the second plate 35. The resin sheet 25 bent in an approximately Z-shape is continuously conveyed to the space 37. The resin sheet 25 that is alternately and repeatedly bent and layered like bellows is pressurized in the layering direction of the resin sheet 25 in the space 37 by the reaction of the slide part 36, thereby forming the layered body 26. The force for pressurizing the layered body 26 is adjustable by changing the load of the slide portion 36. The distance between the first plate 34 and the second plate 35 is provided to be variable, and the thickness of the layered body 26 in the width direction is changeable by changing the distance between the first plate 34 and the second plate 35.

As described above, in the layered body forming step, the resin sheet 25 is folded by pleating by the first blade 32 and the second blade 33 to form the layered body 26.

(Cross-Linking Process)

In the cross-linking step, the silicone in the layered body 26 is cross-linked to form the layered body 26 cross-linked. The silicones in the layered body 26 are cross-linked to each other by cross-linking, and thus the silicone rubber 11 excellent in physical characteristics is produced. In the cross-linking, the silicones in the resin sheet 25 are cross-linked, and the silicones between layered parts of the resin sheet 25 are cross-linked.

The silicone can be heated by a heating portion for heating the layered body 26. The heating portion may be included in the first plate 34, for example. The heating temperature is, for example, 120 to 190° C., depending on types of silicone and cross-linker used as raw materials. The heating time of the silicone is, for example, 3 to 20 minutes, depending on types of silicone and cross-linker used as raw materials. The layered body 26 may be heated under pressure, and the pressure for pressurizing the layered body 26 is, for example, 5 to 15 kPa. In the present embodiment, an example in which the first plate 34 includes a heating portion is described, but the heating portion may be included in a member, such as the second plate 35 or the slide portion 36.

(Slicing Step)

In the slicing step, the layered body 26 cross-linked may be sliced in parallel with a surface of the resin sheet 25 where bent parts are exposed. As described above, the resin sheet 25 is bent in substantially Z-shapes so that bent parts are formed along the width direction. Thus, in the layered body 26, major axes of the thermally conductive fillers 12 are oriented in a direction perpendicular to the surface where the bent parts are exposed. Thus, slicing as described above provides the thermally conductive sheet 10 having a desired thickness and in which major axes of the thermally conductive fillers 12 are oriented in the thickness direction. When the layered body 26 before slicing has a desired thickness, the slicing step is not necessary, and the layered body 26 may be used as the thermally conductive sheet 10 in an electronic device or the like.

The thermally conductive sheet 10 manufactured in this way has a ratio of the peak intensity of the (002) plane to the peak intensity of the (100) plane in a spectrum measured by the X-ray diffraction method from the thickness direction 0.31 or less. When the ratio is 0.31 or less, the (100) planes of the thermally conductive fillers 12 are oriented in the thickness direction of the thermally conductive sheet 10, thereby improving the thermal conductivity of the thermally conductive sheet 10 in the thickness direction. The thickness direction of the thermally conductive sheet 10 corresponds to a direction perpendicular to the surface of the layered body 26 where the bent parts are exposed.

As described above, the method of manufacturing the thermally conductive sheet 10 according to the present embodiment includes the layered body forming step, and the cross-linking step. In the layered body forming step, the resin sheet 25 is folded by pleating by the first blade 32 disposed on one surface side of the resin sheet 25 and the second blade 33 disposed on the other surface side opposite to the one surface side of the resin sheet 25 to form the layered body 26. The resin sheet 25 includes the resin composition including the silicone and the anisotropic thermally conductive fillers 12 dispersed in the silicone, and major axes of the thermally conductive fillers 12 are oriented in the surface direction. In the cross-linking step, the silicone in the layered body 26 is cross-linked to form the layered body 26 cross-linked. The content of the thermally conductive fillers 12 in the resin composition is 52% by volume or more and 75% by volume or less. The ratio of the peak intensity of the (002) plane to the peak intensity of the (100) plane in the spectrum measured by the X-ray diffraction method from the thickness direction of the thermally conductive sheet 10 is 0.31 or less.

In the method of manufacturing the thermally conductive sheet 10 according to the present embodiment, the thermally conductive sheet 10 having high thermal conductivity in the thickness direction as described above is manufactured. In the above-described method, the orientation of the major axes of the thermally conductive fillers is easily controlled by changing the setting, such as pitch or clearance, of the layered body forming machine 30. Therefore, the thermally conductive sheet 10 having high thermal conductivity is manufactured without extrusion molding using a special mold as before. Further, since it is not necessary to control the fluidity of the resin using a special mold as before, improvement in productivity is expected. The pitch is between the first blade 32 and the second blade 33 when the first blade 32 moves to the lowermost side and the second blade 33 moves to the uppermost side and corresponds to a distance in the layering direction of the resin sheet 25. The clearance is a distance between the first plate 34 and the second plate 35 and corresponds to a distance between bent parts of the resin sheet 25.

EXAMPLES

The present embodiment is described in more detail below with reference to examples and comparative examples. However, the present embodiment is not limited to these examples.

The following materials were sufficiently kneaded in the ratios in Table 1, and resin sheets in which major axes of the thermally conductive fillers were oriented in the plane direction (extrusion direction) were manufactured by a single screw extruder. The thickness of the resin sheets manufactured is shown in Table 1. The volume fraction of thermally conductive fillers in Table 1 was calculated by dividing the volume calculated from the mass and density of the thermally conductive fillers by the volume of the thermally conductive sheet.

Silicone: Dow, SILASTIC (registered trademark) DY32-1005U

Cross-linker A: 2,5-dimethyl-2,5-bis(tert-butylperoxy)hexane, Dow, SILASTIC (registered trademark) RC-4 50P Cross-linker B: Dow, SILASTIC (registered trademark) MR-53

Plasticizer: Silicone oil, Shin-Etsu Chemical Co., Ltd., Shin-Etsu Silicone (registered trademark) KF9600-3000cs Thermally conductive fillers: Anisotropic boron nitride (BN), Momentive, PolarTherm (registered trademark) PT110, Average particle diameter 45 μm The obtained resin sheet was pleated in a bellows shape by an accordion pleating machine (product name: accordion pleating machine TK-11) manufactured by TOYO KOKI Co., Ltd. as illustrated in FIG. 2. As described above, the machine folds the resin sheet 25 by pleating by the first blade 32 disposed on one surface side of the resin sheet 25 and the second blade 33 disposed on the other surface side opposite to the one surface side of the resin sheet 25 to form the layered body 26. In the accordion pleating machine, the load of the slide portion 36 was set to 4 kg or more, and the pitch and clearance were set as in Table 1. The pitch is between the first blade 32 and the second blade 33 when the first blade 32 moves to the lowermost side and the second blade 33 moves to the uppermost side and corresponds to the distance in the layering direction of the resin sheet 25. The clearance is the distance between the first plate 34 and the second plate 35 and corresponds to the distance between bent parts of the resin sheet 25.

The first plate 34 of the above-described machine includes the heating portion, and the temperature of the heating portion is set to 170° C. Then, the layered body 26 in which silicone in the obtained layered body 26 was cross-linked was produced. The layered body 26 cross-linked was sliced with a thickness of 1 mm parallel to the surface where the bent parts of the resin sheet were exposed. In this way, the thermally conductive sheets were obtained.

TABLE 1

|  | Example 1 | Comparative Example 1 | Comparative Example 2 | Comparative Example 3 |
|---|---|---|---|---|
| Silicone (parts by mass) | 100 | 100 | 100 | 100 |
| Cross-linker A (parts by mass) | 1.75 | 1.75 | 1.4 | 1.4 |
| Cross-linker B (parts by mass) | 0.75 | 0.75 | 0.6 | 0.6 |
| Plasticizer (parts by mass) | 200 | 200 | 100 | 100 |
| Thermally conductive filers (parts by mass) | 700 | 700 | 400 | 400 |
| Thermally conductive filers (% by volume) | 55 | 55 | 50 | 50 |
| Total amount (parts by mass) | 1002.5 | 1002.5 | 602 | 602 |
| Sheet thickness (mm) | 1 | 1 | 1 | 1 |
| Pitcth (mm) | 10 | 13 | 10 | 13 |
| Clearance (mm) | 15 | 25 | 15 | 25 |
| Peak intensity of (002) plane | 123000 | 105000 | — | — |
| Peak intensity of (100) plane | 430000 | 330000 | | |
| Peak intensity ratio | 0.286 | 0.318 | | |
| Thermal conductivity (W/mK) | 8.1 | 7.0 | | |

[Evaluation]
(X-Ray Diffraction)

The outermost surface in the thickness direction of the thermally conductive sheet was measured using a wide-angle X-ray diffraction apparatus with an X-ray source Cu-Kα, a tube voltage of 50 V, and a tube current of 1000 μA. The ratio of the peak intensity of the (002) plane to the peak intensity of the (100) plane (the peak intensity of the (002) plane/the peak intensity of the (100) plane) was calculated from an XRD pattern obtained by measurement.

(Thermal Conductivity)

The thermal conductivity in the thickness direction of the thermally conductive sheet was measured using a thermal conductivity measuring device (thermal conductivity measuring device HC-110 made by EKO INSTRUMENTS CO., LTD.). The thermal conductivity was obtained by calculating the following equation (1).

$$\lambda = \alpha \cdot \rho \cdot Cp \quad (1)$$

In equation (1), $\lambda$ represents a thermal conductivity (W/m·K) at 25° C., $\alpha$ represents a thermal diffusivity (m$^2$/s) at 25° C., Cp represents a specific heat capacity (J/kg·K) at 25° C., and $\rho$ represents a density (kg/m$^3$) at 25° C. The thermal diffusivity was measured by the laser flash method in accordance with JIS R1611. The specific heat capacity was measured by the DSC method according to JIS K7123-1987. The density was measured by the underwater displacement method according to JIS K7112:1999. The measurement results are shown in Table 1.

The thermal conductivity of the thermally conductive sheet of example 1 was 8.0 W/m·K or more. It is considered that this is because the ratio of the peak intensity of the (002) plane to the peak intensity of the (100) plane was 0.31 or less.

In contrast, the thermally conductive sheet of comparative example 1 was made of the same resin sheet as that of example 1, but the thermal conductivity was 7.8 W/m·K or less. Since the pitch and clearance of the pleating machine were widened to manufacture the resin formed body, it is considered that the resin sheet was not stretched during the pleating process and the orientation of the thermally conductive sheet was not sufficient. It is considered that this makes the peak intensity ratio exceed 0.31 and lowers the thermal conductivity compared to that of the thermally conductive sheet of example 1.

The thermally conductive sheets of comparative examples 2 and 3 could not be pleated. It is considered that because the content of the thermally conductive fillers is small and the stickiness of the sheet is large, the shape was lost in the pleating machine and the orientation direction could not be kept.

The present embodiment has been described above. The present embodiment is however not limited thereto, and various modifications can be made within the scope of the gist of the present embodiment.

What is claimed is:

1. A method of manufacturing a thermally conductive sheet, comprising:
    forming a layered body by folding a resin sheet that comprises a resin composition comprising a silicone and thermally conductive fillers including a boron nitride that are anisotropic, the thermally conductive fillers being dispersed in the silicone, and has major axes of the thermally conductive fillers oriented in a plane direction by pleating by a first blade disposed on a first surface side of the resin sheet and a second blade disposed on a second surface side opposite to the first surface side of the resin sheet; and
    cross-linking the silicone in the layered body to form a cross-linked layered body, wherein
    a content of the thermally conductive fillers in the resin composition is 52% by volume or more and 75% by volume or less, and
    a ratio of a peak intensity of a (002) plane of the boron nitride to a peak intensity of a (100) plane of the boron nitride in a spectra measured from a thickness direction of the thermally conductive sheet by an X-ray diffraction method is 0.31 or less.

2. The method of manufacturing a thermally conductive sheet according to claim 1, further comprising:
    slicing the cross-linked layered body parallel to a surface where bent parts of the resin sheet are exposed.

3. The method of manufacturing the thermally conductive sheet according to claim 1, wherein the ratio is greater than 0.2 and less than 0.31.

4. The method of manufacturing the thermally conductive sheet according to claim 1, wherein the content of the thermally conductive fillers in the resin composition is 52% by volume or more and 58% by volume or less.

5. The method of manufacturing the thermally conductive sheet according to claim 1, wherein the distance between the first blade and the second blade in the layering direction of the resin sheet when the first blade moves to a lowermost side and the second blade moves to an uppermost side during pleating is 10 mm or less, and the distance between bent parts of the resin sheet is 15 mm or less.

\* \* \* \* \*